United States Patent
Ryan et al.

(10) Patent No.: US 9,875,636 B2
(45) Date of Patent: *Jan. 23, 2018

(54) COLLISION SENSOR ASSEMBLY FOR A STATIONARY STRUCTURE

(71) Applicant: Sentry Protection LLC, Lakewood, OH (US)

(72) Inventors: James P. Ryan, Lakewood, OH (US); Jeffrey P. Wagner, Greenfield, IN (US)

(73) Assignee: Sentry Protection LLC, Lakewood, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/459,831

(22) Filed: Mar. 15, 2017

(65) Prior Publication Data

US 2017/0193791 A1    Jul. 6, 2017

Related U.S. Application Data

(63) Continuation of application No. 15/178,610, filed on Jun. 10, 2016, now Pat. No. 9,633,539, which is a
(Continued)

(51) Int. Cl.
*G01L 5/00* (2006.01)
*G08B 21/18* (2006.01)
(Continued)

(52) U.S. Cl.
CPC ............... *G08B 21/18* (2013.01); *B65G 1/02* (2013.01); *G01L 5/00* (2013.01); *G01L 5/0052* (2013.01);
(Continued)

(58) Field of Classification Search
CPC .......... A63B 2220/803; A63B 2220/53; A63B 2024/004; G01P 15/18; G01P 5/008; G01P 5/00; G01P 5/0052
See application file for complete search history.

(56) References Cited

U.S. PATENT DOCUMENTS

| 5,431,409 A | 7/1995 | Webster |
| 6,172,604 B1 | 1/2001 | Heillman |

(Continued)

FOREIGN PATENT DOCUMENTS

DE    102010052108    5/2012

OTHER PUBLICATIONS

International Search Report and Written Opinion for corresponding International Patent Application No. PCT/US2014/038559 dated Sep. 30, 2014.
(Continued)

*Primary Examiner* — Benyam Haile
(74) *Attorney, Agent, or Firm* — Wegman, Hessler & Vanderburg

(57) ABSTRACT

A collision sensor assembly is attachable to a stationary structure such as a pallet rack, a door frame, the corner of a wall, or the like. The collision sensor is configured to sense when a collision occurs with the stationary structure such as when a piece of movable machinery contacts the stationary structure. The collision sensor assembly includes a sensor operatively connected to a processor which determines when a collision occurs, and produces a signal to an output signal generator to provide an external indication of the collision.

23 Claims, 2 Drawing Sheets

Related U.S. Application Data continuation of application No. 14/280,946, filed on May 19, 2014, now Pat. No. 9,383,275.

(60) Provisional application No. 61/831,787, filed on Jun. 6, 2013.

(51) Int. Cl.

| | | |
|---|---|---|
| *G01S 17/93* | (2006.01) | |
| *B65G 1/02* | (2006.01) | |
| *G01P 1/07* | (2006.01) | |
| *G01P 15/00* | (2006.01) | |
| *G01P 15/18* | (2013.01) | |
| *A63B 24/00* | (2006.01) | |

(52) U.S. Cl.
CPC ............ *G01P 1/07* (2013.01); *G01P 15/001* (2013.01); *G01S 17/936* (2013.01); *A63B 2024/004* (2013.01); *A63B 2220/53* (2013.01); *A63B 2220/803* (2013.01); *B65G 2207/28* (2013.01); *B65G 2207/40* (2013.01); *G01L 5/008* (2013.01); *G01P 15/00* (2013.01); *G01P 15/18* (2013.01)

(56) References Cited

U.S. PATENT DOCUMENTS

| | | | |
|---|---|---|---|
| 6,367,408 | B1 | 4/2002 | Gu |
| 6,963,278 | B2 | 11/2005 | Frame |
| 7,212,829 | B1 | 5/2007 | Lau |
| 8,058,985 | B2 | 11/2011 | Dobson |
| 9,633,539 | B2 * | 4/2017 | Ryan .................... G01S 17/93 |
| 2006/0038694 | A1 | 2/2006 | Naunheim |
| 2006/0047466 | A1 | 3/2006 | White |
| 2006/0054693 | A1 | 3/2006 | Kawai |
| 2006/0250235 | A1 | 11/2006 | Astrin |
| 2007/0105072 | A1 | 5/2007 | Koljonen |
| 2009/0127397 | A1 | 5/2009 | Hyunh |
| 2009/0249858 | A1 | 10/2009 | Ishikawa |
| 2011/0082812 | A1 | 4/2011 | Salemizadeh |
| 2011/0239790 | A1 | 10/2011 | Kuczynski |

OTHER PUBLICATIONS

Supplementary European Search Report for corresponding European patent application No. 14807323 dated Mar. 20, 2017.

\* cited by examiner

COLLISION SENSOR ASSEMBLY FOR A STATIONARY STRUCTURE

CROSS-REFERENCE TO RELATED APPLICATIONS

The present application is a continuation application and claims priority to Ser. No. 15/178,610, filed on Jun. 10, 2016, which is a continuation and claims priority to U.S. Pat. No. 9,383,275, filed May 19, 2014, which claims priority to U.S. Provisional Application Ser. No. 61/831,787, filed Jun. 6, 2013, which is hereby incorporated by reference herein in its entirety.

FIELD OF THE INVENTION

The present invention is directed to a collision sensor, and more particularly, to a sensor that registers when a stationary structure has been hit or received some other collision.

BACKGROUND OF THE INVENTION

In manufacturing, shipping, storing, and other industries, warehouses are often used for storing pallets of goods. The pallets are typically stored on pallet racks or other stationary structural member having sufficient strength to carry heavy loads as well as being able to withstand loading and unloading of the pallets at different levels. Hand trucks, hand lifts, forklifts, and the like are typically used to transfer pallets from one location to another and to position the pallets on or below the pallet rack.

These transport machinery can sometimes contact or otherwise crash into the pallet racks as they are often awkward or difficult to maneuver within small spaces between pallet racks. Such accidents can cause severe damage to the pallet racks that would otherwise make the pallet racks unstable or unable to withstand loads thereon. Unless the accident is reported, there may not be any visual indication that the structural integrity of the structure has been compromised.

Powered machinery such as forklifts may include their own collision sensor, the valuables in a warehouse or business is often the goods stored therein or the structure itself. The collision sensor(s) on the powered machinery only provide an on-board warning, but does not indicate which structure within a building or the like has been contacted, so a manager or structural supervisor may not be able to determine which stationary structure was struck by the machinery.

BRIEF SUMMARY OF THE INVENTION

A need therefore exists for a collision sensor for sensing when a substantially stationary structure has been contacted by moving machinery. The collision sensor is configured to generate at least one output signal to provide a warning or other external indication that the structural integrity of the stationary structure needs to be examined.

In one aspect of the present invention, a collision sensor assembly attachable to a stationary structure is provided. The collision sensor assembly includes a housing attachable to the stationary structure. A processor is located within the housing. At least one sensor is operatively connected to the processor, wherein the sensor senses a collision with the stationary structure. An output signal generator is operatively connected to the processor. The output signal generator provides at least one external indication of the collision.

In another aspect of the present invention, a collision sensor assembly attachable to a stationary structure is provided. The collision sensor assembly includes a housing attachable to the stationary structure. A processor is located within the housing. A sensor is positioned within the housing. The sensor is operatively connected to the stationary structure and the processor, wherein the sensor senses a collision with the stationary structure. An output signal generator is operatively connected to the processor. The output signal generator provides at least one external indication of the collision.

Advantages of the present invention will become more apparent to those skilled in the art from the following description of the embodiments of the invention which have been shown and described by way of illustration. As will be realized, the invention is capable of other and different embodiments, and its details are capable of modification in various respects.

BRIEF DESCRIPTION OF SEVERAL VIEWS OF THE DRAWINGS

These and other features of the present invention, and their advantages, are illustrated specifically in embodiments of the invention now to be described, by way of example, with reference to the accompanying diagrammatic drawings, in which.

Figure 1:
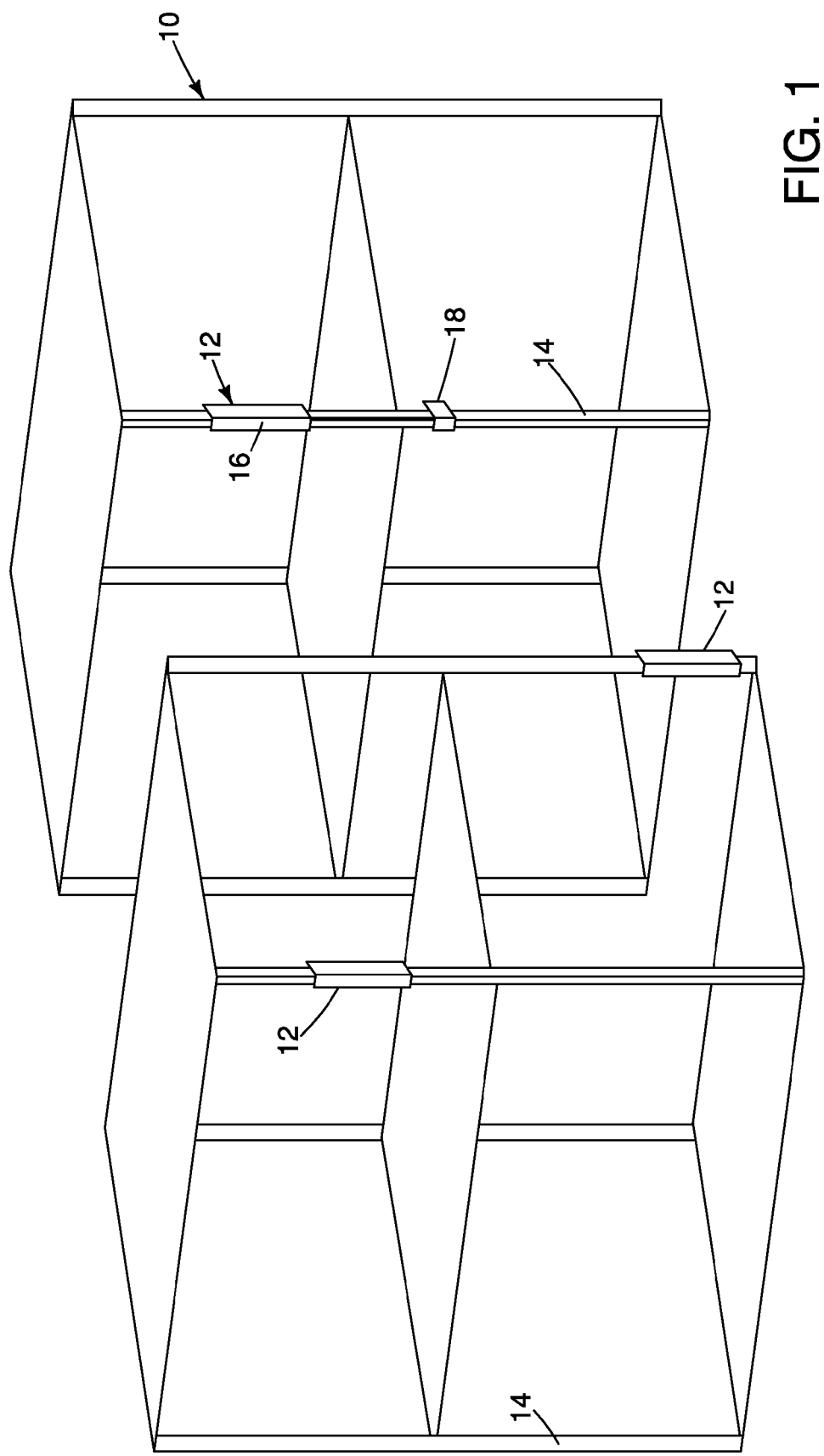
FIG. 1 is a pair of exemplary collision sensor assemblies attached to stationary structures.

It should be noted that all the drawings are diagrammatic and not drawn to scale. Relative dimensions and proportions of parts of these figures have been shown exaggerated or reduced in size for the sake of clarity and convenience in the drawings. The same reference numbers are generally used to refer to corresponding or similar features in the different embodiments. Accordingly, the drawing(s) and description are to be regarded as illustrative in nature and not as restrictive.

DETAILED DESCRIPTION OF THE PREFERRED EMBODIMENT

Referring to FIG. 1, a stationary structure 10 having a collision sensor 12 operatively connected thereto is shown. The stationary structure 10 can be any non-moving structure such as a building wall, door frame, pallet rack for holding pallets of goods. The term "stationary structure" is intended to mean any structure that is permanently stationary or other structure that is otherwise intended to remain substantially stationary for extended periods of time and may or may not be movable. The collision sensor assembly 12 is configured to sense a collision of a secondary object —such as a fork lift, a lift truck, machinery, or other moving object—with the stationary structure 10 and to generate an output for indicating such a collision has occurred.

The stationary structure 10, shown as a pallet rack 14 in FIG. 1, is a structure that is part of a building or within a building, wherein the stationary structure 10 is susceptible to damaging collisions from movable machinery. For example, a pallet rack within a warehouse is continually susceptible to being hit, scraped, or otherwise contacted by a hand truck, hand lift, fork truck, or other movable machinery used to remove, reposition, or otherwise move pallets within the warehouse for storage on the pallet rack 14. Although not all contact with the stationary structure 10 is damaging such that the extent of the damage requires significant repair or replacement, the collision sensor assembly 12 can be configured to generate an output signal to indicate that any severity of a collision has taken place, thereby allowing personnel to examine the stationary structure 10 to evaluate the extent of the damage caused by the collision and the structural integrity of the stationary structure 10. The collision sensor assembly 12 can also be configured to generate an output signal to indicate the location of the collision with respect to either the physical location within the building or the physical location on the stationary structure 10 that was contacted. The stationary structure 10 can be repairable, replaceable, or even removable as a result of a collision therewith. In an embodiment, the stationary structure 10 may include at least one corner, or edge, by which machinery, equipment, or other movable machinery can contact while moving from around or by the stationary structure 10. Although the exemplary pallet rack 14, shown in FIG. 1, is in a high-traffic area and/or have a corner or edge around which machinery is often moved, it should be understood by one of ordinary skill in the art that the stationary structure 10 can also include walls or other elongated non-corner structure that is likewise susceptible to collision with a moving object.

As shown in FIG. 1, the collision sensor assembly 12 includes a housing 16 that is attachable to the stationary structure 10. In one of the illustrated exemplary embodiments, a sensor 18 is spaced-apart from the housing 16 and is attached to the stationary structure 10. The sensor 18 can be positioned at a location that would likely be contacted during a collision, or any other location on the stationary structure 10 that would allow the sensor 18 to determine when a collision with the stationary structure 10 has occurred. The housing 16 can be located at any position along the height of the stationary structure 10, thereby keeping the housing from being contacted during a collision while locating the sensor 18 at a position along the height of the stationary structure 10 that would likely be contacted during a collision. In another of the illustrated exemplary embodiments, the sensor 18 is integrally positioned within the housing 16 such that the sensor 18 is operatively affixed to the stationary structure 10 when the collision sensor assembly 12 is attached to the stationary structure 10. The collision sensor assembly 12 having the integrated sensor 18 can be positioned near or close to the floor, or any other position along the height of the stationary structure 10 that would likely be contacted in a collision with the stationary structure 10. The collision sensor assembly 12 also includes a processor 20 and an output signal generator 22 positioned within the housing 16.

The sensor 18 of the collision sensor assembly 12 is configured to measure when a collision has occurred with the stationary structure 10 to which the assembly is attached and generate an output signal indicating such a collision has taken place. The sensor 18 can be directly or indirectly attached to the stationary structure 10, provided that the sensor 18 can sense a collision. The sensor 18 can be any mechanical, electrical, chemical or other commonly known sensor that is capable of registering a collision with the structure to which it is attached. Exemplary sensors may include an accelerometer, voltage sensor, strain gauge, laser sensor, proximity sensor, vibration sensor, magnetic sensor, and the like. The sensor 18 is configured to sense a change in state, or otherwise determine that a collision with the stationary structure 10 has occurred. The collision sensor assembly 12 may include one or more sensors 18 operatively connected thereto. For example, the collision sensor assembly 12 may include a sensor attachable to each leg of a pallet rack 14, wherein each sensor 18 is operatively connected to the collision sensor assembly 12 for detecting when any leg of the pallet rack 14 has been contacted. A collision sensor assembly 12 may also include multiple sensors 18 of different types operatively connected thereto. For example, a collision sensor assembly 12 includes an accelerometer as well as a strain gauge, which can increase the likelihood of detecting a collision with the stationary structure 10. In an embodiment, the sensor 18 is connected to the processor 20 by a wire or other electrical connection, wherein the sensor 18 is powered by the processor. In another embodiment, the sensor 18 is wirelessly connected to the processor 20, and the sensor 18 can include an independent power source. When the sensor 18 senses a collision, a signal (or a change in signal) is transmitted to a processor 20 positioned within the housing 16. The signal generated by the sensor 18 may provide information that a collision has occurred, a damaging collision has occurred, the location of the collision along the vertical height of the stationary structure 10, or the like.

The processor 20 is configured to receive a signal from the sensor 18 (or sensors) operatively connected thereto. The processor 20 determines where there has been a change in state of the sensor 18 or otherwise determines when there has been a collision with the stationary structure 10 to which the collision sensor assembly 12 is connected. The processor 20 receives at least one signal from a sensor 18 and is configured to either provide continuous monitoring of the sensor 18 or passively monitor the sensor 18. Passively monitoring the sensor 18 may include only processing the signal from the sensor 18 when the sensor transmits a signal to the processor 20. When the processor 20 determines that a collision has occurred with the stationary structure 10 to which the collision sensor assembly 12 is attached, a signal is transmitted to an output signal generator 22 so that the output signal generator 22 generates an output signal from the collision sensor assembly 12 to indicate to a user, operator, or another system that a collision has occurred.

The output signal generator 22 is configured to generate an external indication that a collision with the stationary structure 10 has occurred. In an embodiment, the output signal generator 22 is a light attached to the housing 16 that is turned on after a collision. The light indicates to a user that the stationary structure 10 needs to be examined to determine the extent of the damage caused by the collision, and the light should remain on until such examination has taken place. In another embodiment, the output signal generator 22 is integral with or separate from the processor 20 and is an email or text message generator that sends an email and/or text message to a user that indicates that a collision with the stationary structure 10 has occurred. The wireless email and/or text message generator can also indicate the particular stationary structure 10 that has been in a collision and/or the location on the particular stationary structure 10 that has been in a collision. In a warehouse in which a collision sensor assembly 12 is attached to each pallet rack 14, the email and/or text message that indicates the particular pallet rack 14 that has been contacted is particularly helpful to reduce or eliminate the need to examine each pallet rack 14 for damage. The email and/or text message may also indicate the location on the pallet rack 14 that was contacted during the collision as well as whether or not there was damage to the pallet rack 14. The output signal generator 22 can also be configured to repeatedly send emails and/or texts indicating a collision in certain intervals of time until the stationary structure 10 has been examined and the output signal generator 22 can be reset. In a further embodiment, the output signal generator 22 may be a warning siren. In another embodiment, the output signal generator 22 can produce multiple external indications of a collision. In yet a further embodiment, the output signal generator 22 may be configured to send a signal or message to a remote computer or processor for further processing, reading, or other data management. For example, some distribution centers utilize warehouse management systems that utilize software that direct and coordinate the movement of goods within the distribution center as well as movement of goods in shipping. The output signal generator 22 can be operatively connected to such a system, wherein the output signal generator 22 provides an output signal or output data to the warehouse management system (and/or the software) to indicate a collision. It should be understood by one of ordinary skill in the art that these embodiments of external indicia produced by the output signal generator 22 are merely exemplary and that any type of external indicia can be used to indicate that a collision with the stationary structure 10 has occurred.

In an embodiment, a collision sensor assembly 12 is attached to each stationary structure 10 to monitor and determine when the structure has been in a collision and to provide an external indication of such a collision. In another embodiment, each collision sensor assemblies 12 are connected to a network that is configured to collect data from each of the collision sensor assemblies 12 for continual monitoring of the status of each stationary structure 10 within a building or warehouse.

Figure 2:
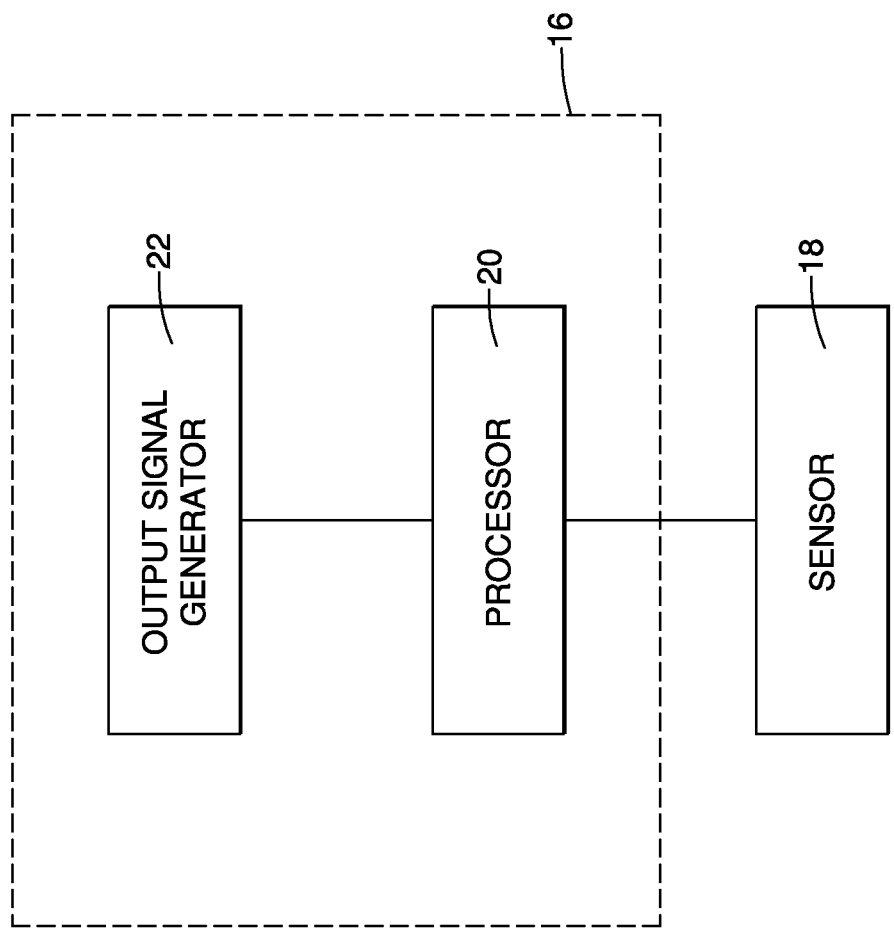
FIG. 2 is a schematic of a collision sensor assembly.

The collision sensor assembly 12, as illustrated in the schematic of FIG. 2, includes a sensor 18 operatively connected to a processor 20, and the processor 20 is operatively connected to an output signal generator 22. The processor 20 and output signal generator 22 can be positioned within the housing and the sensor 18 is positioned in a spaced-apart manner relative to the housing 16, as shown in FIG. 2. In another embodiment, the sensor 18 is positioned within the housing 16. The collision sensor assembly 12, including the sensor 18, is releasably attachable to a stationary structure 10.

While preferred embodiments of the present invention have been described, it should be understood that the present invention is not so limited and modifications may be made without departing from the present invention. The scope of the present invention is defined by the appended claims, and all devices, processes, and methods that come within the meaning of the claims, either literally or by equivalence, are intended to be embraced therein.

What is claimed is:

1. A collision sensor assembly comprising:
   a housing releasably attachable to a stationary structure within a building;
   a sensor for sensing a collision between a secondary object and said stationary structure, said sensor being positioned within said housing or integrally attached to said housing, said sensor generating an output signal in response to a collision;
   a processor located within said housing for receiving said output signal from said sensor; and
   an output signal generator operatively connected to said processor for generating at least one external indication in response to said collision.

2. The collision sensor assembly of claim 1 further comprising a second sensor for sensing a collision between said secondary object and said stationary structure.

3. The collision sensor assembly of claim 2, wherein said sensor and said second sensor are different types of sensors.

4. The collision sensor assembly of claim 2, wherein said second sensor is positioned within said housing or integrally attached to said housing.

5. The collision sensor assembly of claim 2, wherein said second sensor is spaced apart from said housing.

6. The collision sensor assembly of claim 1, wherein said sensor generates an output signal indicating a damaging collision.

7. The collision sensor assembly of claim 1, wherein said at least one external indication from said output signal generator is an audible sound, a visible warning, an email message, or a text message, or a combination thereof.

8. The collision sensor assembly of claim 1, wherein said at least one external indication from said output signal generator indicates a location of said collision within said building.

9. A collision sensor assembly comprising:
   a housing releasably attachable to a stationary structure within a building;
   a sensor for sensing a collision between a secondary object and said stationary structure, said sensor being directly attached to said stationary structure, said sensor generating an output signal in response to a collision;
   a processor located within said housing for receiving said output signal from said sensor; and
   an output signal generator operatively connected to said processor for generating an external indication in response to said collision.

10. The collision sensor assembly of claim 9, wherein said output signal generator provides a relative location on said stationary structure of said collision.

11. The collision sensor assembly of claim 9, wherein said housing is attachable to said stationary structure at a location wherein said housing is contacted during said collision.

12. The collision sensor assembly of claim 9, wherein said sensor is spaced-apart from said housing.

13. The collision sensor assembly of claim 9, wherein said output signal generator generates a wireless output data signal indicating said collision.

14. The collision sensor assembly of claim 13, wherein said wireless output data signal is a text message or an email message.

15. A collision sensor assembly comprising:
   a housing releasably attachable to a stationary structure within a building;
   at least one sensor for sensing a collision between a secondary object and said stationary structure, wherein a first sensor is located within said housing and a second sensor is spaced apart from said housing, and each of said sensors generates an output signal in response to said collision;
   a processor located within said housing for receiving said output signal from each of said sensors; and
   an output signal generator operatively connected to said processor for generating an external indication in response to said collision.

16. The collision sensor assembly of claim 15, wherein said first sensor and said second sensor are different types of sensors.

17. The collision sensor assembly of claim 15, wherein said processor passively monitors said first and said second sensors for at least one of said output signals.

18. The collisions sensor assembly of claim 15, wherein said processor actively monitors said first and said second sensors for at least one of said output signals.

19. The collision sensor assembly of claim 18, wherein said wireless output data signal is received by an application on a wireless handheld device.

20. A method for sensing a collision between a secondary object and a stationary structure within a building, said method comprising:
   attaching a collision sensor to said stationary structure, said collision sensor including:
      a housing;
      at least one sensor, each of said at least one sensor generates an output signal;
      a processor receiving said output signal from each of said at least one sensor; and
      an output signal generator operatively connected to said processor;
   monitoring said output signal from each of said at least one sensor;
   determining when said output signal from one of said at least one sensor changes state; and
   generating an external indication from said output signal generator in response to said change in state of said output signal from at least one sensor.

21. The method of claim 20, wherein said change in state of said output signal from said at least one sensor is a result of said collision between said secondary object and said stationary structure.

22. The method of claim 20, wherein said monitoring is active monitoring.

23. The method of claim 20, wherein said monitoring is passive monitoring.

* * * * *